United States Patent [19]

Nowak et al.

[11] Patent Number: 4,579,448

[45] Date of Patent: Apr. 1, 1986

[54] MIRRORS UTILIZED IN AN OPTICAL SCANNING SYSTEM

[75] Inventors: William J. Nowak, Rochester; Alan M. Litman, Webster, both of N.Y.

[73] Assignee: Xerox Corporation, Stamford, Conn.

[21] Appl. No.: 702,167

[22] Filed: Feb. 15, 1985

[51] Int. Cl.⁴ .................. G03B 27/48; G03B 27/50; G03B 27/70

[52] U.S. Cl. .................. 355/51; 350/609; 355/60; 355/66

[58] Field of Search .................. 355/51, 66, 8, 11, 57, 355/60; 350/609

[56] References Cited

U.S. PATENT DOCUMENTS

| | | | |
|---|---|---|---|
| 3,030,259 | 4/1962 | Long | 156/245 |
| 3,136,674 | 6/1964 | Dunkle et al. | 156/197 |
| 3,453,041 | 7/1969 | Rantsch | 350/609 |
| 3,535,098 | 10/1970 | Babcock | 65/33 |
| 3,644,022 | 2/1972 | Jagdt et al. | 350/609 |
| 3,754,812 | 8/1973 | Mohm | 350/167 |
| 3,912,380 | 10/1975 | Klein | 350/609 |
| 4,124,277 | 11/1978 | Stang | 350/609 |
| 4,331,383 | 5/1982 | Christiansen | 350/609 |
| 4,466,700 | 8/1984 | Christiansen et al. | 350/609 |

Primary Examiner—Richard A. Wintercorn
Attorney, Agent, or Firm—Joseph R. Sakmyster

[57] ABSTRACT

An improved document scanning system is realized by using low mass mirrors as optical components. The mirrors consist of a pair of metal structures in honeycomb form sandwiched between a pair of glass skins. The mirrors have a greatly improved stiffness-to-mass ratio compared to conventional mirrors and provide relatively low mass in scan drive components, as well as improved system performance.

2 Claims, 8 Drawing Figures

MIRRORS UTILIZED IN AN OPTICAL SCANNING SYSTEM

The present invention relates to an optical scanning system and in particular, to a scanning system utilizing mirrors for scanning a document at an object plane and incrementally projecting an image of the document onto a photosensitive image plane.

Strip scanning systems are well known in the art; two examples being disclosed in U.S. Pat. Nos. 4,407,581 and 4,029,409. For these systems having a document mounted on a stationary platen, a group of optical components are mounted on at least one optical carriage placed beneath the platen. These components, usually including a lamp and associated mirror, incrementally scan/illuminate the document, reflecting an incremental image of the document into a lens which, in turn, projects an image of the document onto a photosensitive medium.

One problem associated with the prior art scanning systems is the limitations on scanning speed due to the mass of the scanning mirror substrate. The mirror, together with the other scanning components, must be accelerated to scan and return-of-scan speeds; prior art mirrors, typically composed of homogeneous soda lime glass, require drive components capable of imparting the desired accelerations. The mirror mass is the most significant factor in compensating for the vibration effects attributed to the natural frequency of the scan system. Natural frequency is directly proportional to the mass of the object being moved; hence, the lower the mass, the lower the natural frequency and the less the vibration (thereby minimizing aerial image motion). A reduction in the mirror mass would therefore have several beneficial results. A major consideration when considering ways of reducing the mass of a scanning mirror, however, is the requirement to maintain mirror stiffness. The planar reflective surface must be rigid enough to insure uniform light reflection from the surface. According to one aspect of the present invention, there is provided a document scanning system utilizing mirrors of lower mass and greater natural frequency than those used in the prior art devices. More particularly, the invention is directed to a novel scanning mirror comprising a composite structure of a lightweight metal honeycomb substrate sandwiched between two pieces of glass. The honeycomb substrate has a thickness sufficient to maintain the required stiffness while providing greatly decreased mass as compared to conventional mirror structures.

DESCRIPTION

Figure 1:
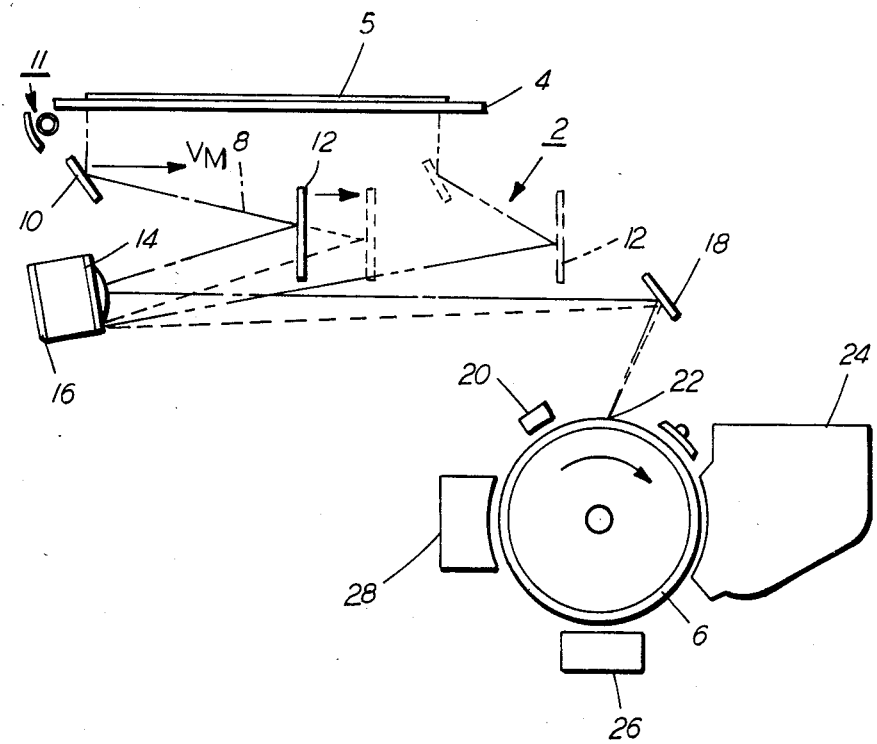
FIG. 1 is a schematic drawing of a scanning system utilizing at least one of the mirrors constructed according to the principles of the present invention.

Referring now to FIG. 1, a folded optical scanning system is represented generally at 2 and includes an object surface or platen 4 having an original document 5 placed thereon, and a photosensitive surface in the form of a photoreceptor drum 6. An optical path 8 extends between object surface 4 and drum 6, and is representative of the path of the principal ray of light between the document and the drum. A first reflector 10, an illumination assembly 11, a second reflector 12, a reflector projection lens 14 including a lens reflector 16, and an image reflector 18 are disposed along the optical path 8. The photoreceptor drum 6 is mounted for movement relative to the optical path 8. Mirrors 10 and 12 are mounted on separate carriages, not shown, but which are moved in a parallel path beneath platen 4 and are conventional to the scanning art.

In operation, mirror 10 and illumination assembly 11 move parallel to the object surface 4 through a given displacement and at a given speed $V_m$ as indicated by the arrow. Mirror 12 moves with mirror 10 at half the speed of $V_m$ and through a displacement half that of mirror 10. This synchronous movement of mirrors 10 and 12 maintains a constant object conjugate, and a composite image of the strip-scanned document 5 is incrementally projected from the object surface 4 onto the image surface 6 via le ns 14. At the end of scan position (shown in dotted form) mirrors 10 and 12 must be returned quickly to the start-of-scan position.

The various processes for producing an output copy of the exposed original are well known in the art and hence a detailed description is not provided. Briefly, however, at station 20 an electrostatic charge is placed uniformly over the surface of the moving photoconductive drum surface. The charged drum surface is then moved through an exposure station 22, where the flowing light image of the document 5 is recorded on the drum surface. As a result of this imaging operation, the charge on the drum surface is selectively dissipated in the light-exposed region thereby recording the original input information on the photoconductive plate surface in the form of a latent electrostatic image. Next, in the direction of drum rotation, the image-bearing drum surface is transported through a development station 24 wherein a toner material is applied to the charged surface, thereby rendering the latent electrostatic image visible. The now developed image is brought into contact with a sheet of final support material, such as paper or the like, within a transfer station 26 wherein the toner image is electrostatically attracted from the photoconductive plate surface to the contacting side of the support sheet. Station 28 represents a mechanism for cleaning toner from the drum surface. These various xerographic stations and their functions are more fully described in U.S. Pat. No. 4,318,610, whose contents are hereby incorporated by reference.

Figure 2:
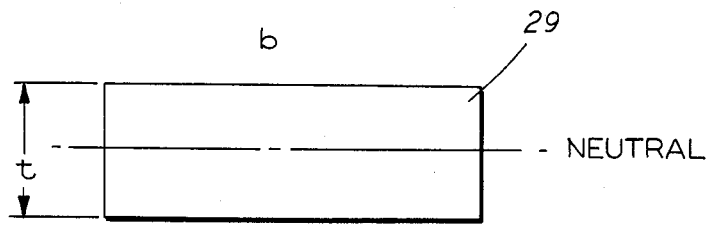
FIG. 2 shows a cross-sectional view of a rectangular member approximating a mirror configuration.

Applicants, when considering how best to reduce the overall mass of mirrors 10, 12 while maintaining the required bending stiffness, examined first the theoretical relationship between stiffness and mass. Referring to FIG. 2, there is shown a cross-section of a rectangular member 29 having a base "b" and a thickness "t".

The simplest method to decrease overall structural mass without significantly decreasing bending stiffness of the structural member is by the removal of material around the axis of a rectangular cross section shown. The bending moment of inertia, I, is given by the following equation:

$$I = (bt^3)/12 \qquad (1)$$

where "b" and "t" are the base and thickness dimensions, respectively. For a given structural material, "I" is the governing value in all stiffness and bending theoretical relationships.

Examining next the removal of a core material symmetric about the neutral axis so as to cause no shift in the neutral axis, the following equation expresses the relation between I, b and t:

$$I_{net} = \frac{b_1 t_1^3}{12} - \frac{b_2 t_2^3}{12} \qquad (2)$$

Figure 3:
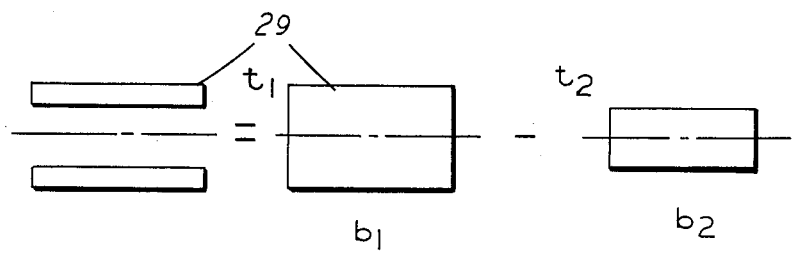
FIG. 3 shows the removal of symmetrical core material from the rectangular member of FIG. 2.

The $b_1$, $b_2$, $t_1$, $t_2$ dimensions are are shown in FIG. 3. If $b_1 = b_2 = b$ and $t_1 \geq t_2 \geq 0$ the above equation becomes:

$$I_{net} = \frac{b(t_1^3 - t_2^3)}{12} \qquad (3)$$

which is the theoretical bending moment of inertia of finite-spaced plates of equal stiffness and equal distance from the neutral axis provided the plates are structurally interactive with one another. To maintain the relative location of the plates with respect to each other, and to greatly reduce total mass, Applicants realized that the addition of a light and compressively resistant honeycomb core could be used as the core material. Selection of this material serves to maintain the distance between plates to prevent buckling and also to transmit a portion of the shearing forces as a homogeneous structural member would do.

Assuming that stiffness losses due to shear effects are negligible, the following equations are theoretical statements of stiffness, k, and mass, m, for a composite beam:

$$k = \frac{3EI_{net}}{l_c^3} \qquad (4)$$

where k is the stiffness of the cantilever beam (lbs/in), E is the modulus of elasticity of glass (lb/in$^2$) and $l_c$ is the distance from the fixed end to the point of load application (in). And, $$m = \frac{\gamma b(t_1 - t_2)}{g} \qquad (5)$$

where m is the total mass of the beam (lbs sec$^2$/in), $\gamma$ is the weight density of glass (lbs/in$^3$), and g is the acceleration due to gravity (in/sec$^2$).

Figure 4:
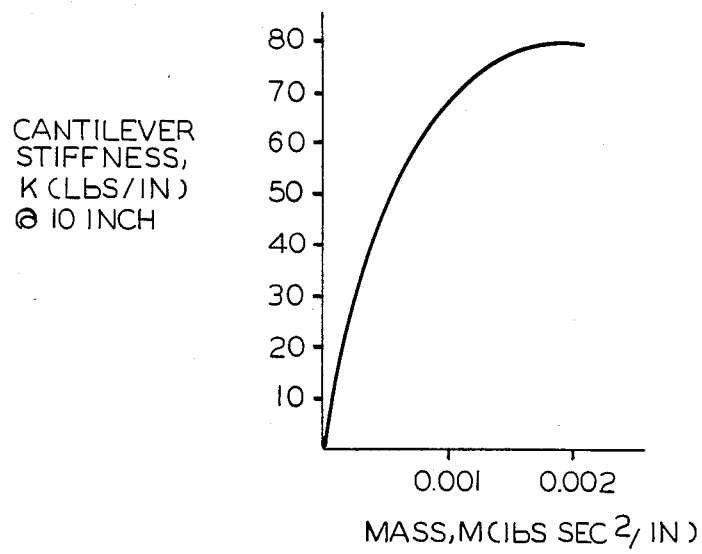
FIG. 4 is a plot of cantilever stiffness vs. mass for a rectangular member.

Reviewing equations (3) and (4) it can be seen for any given composite geometry, that the stiffness, k, varies by the quantity $(t_1^3 - t_2^3)$. This means as $t_2$ increases from 0 to $t_1$, (i.e., $0 \leq t_2 \leq t_1$) the mass decreases at a much quicker rate than does the stiffness. A plot of equation (4) vs. equation (5) for the given mirror geometry is shown in FIG. 4.

Figure 5:
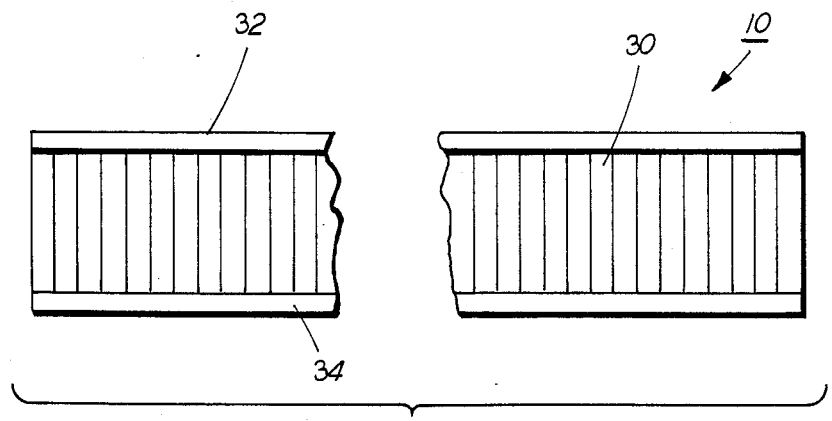
FIG. 5 is a long edge view of the mirror of the present invention.
Figure 6:
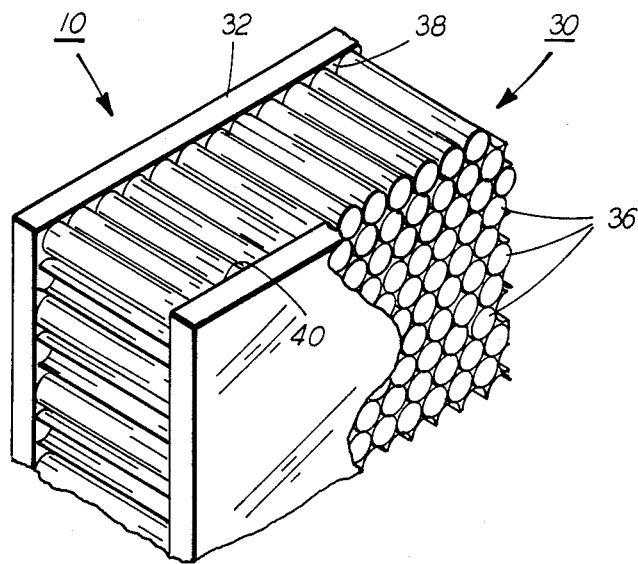
FIG. 6 is a side perspective view showing the honeycomb interior substrate of the mirror.

Turning now to FIGS. 5 and 6 and according to the present invention, there is shown a first embodiment of a low mass mirror construction for mirror 10. (Mirror 12 can be of the same construction.) FIG. 5 is a long edge view of the mirror and FIG. 6 is a side perspective view showing the honeycomb interior structure. In FIG. 5, the basic mirror construction is an aluminum honeycomb substrate 30 bonded to two polished glass skins 32, 34. As shown in FIG. 6, substrate 30 has a characteristic honeycomb configuration comprising a plurality of interconnected, apertured cells 36. Substrate 30 is bonded to glass segments 32, 34 by an epoxy adhesive layer 38, 40, respectively.

In a preferred embodiment, skins 32, 34 are 0.040" thick glass, substrate 30 comprises ⅛ inch cells with a 3/16 inch thickness honeycomb with individual cells sold under the trade name HEXCEL. The mirror dimensions are 17" long by 2" high by 0.272" thick. Total weight is 0.30 lbs.

Figure 7:
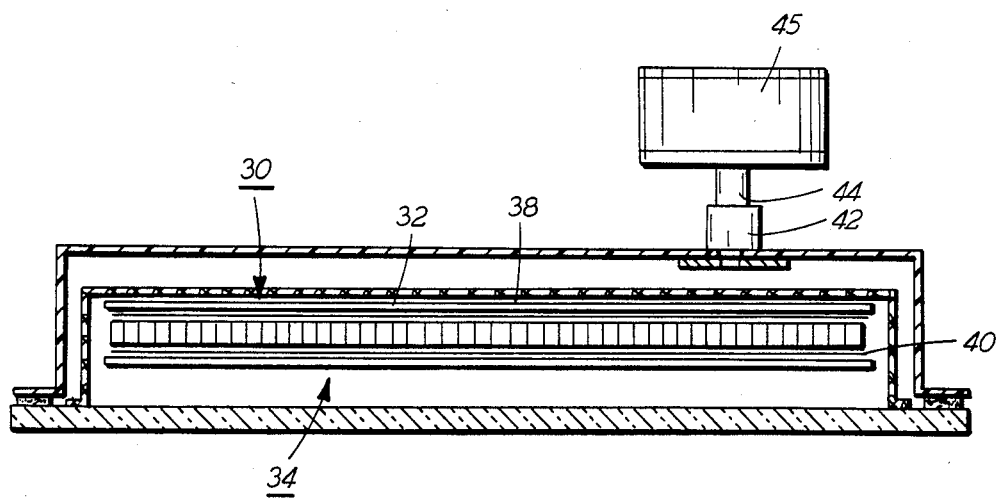
FIG. 7 is a schematic view of a manufacturing apparatus for assembly mirror of FIGS. 5 and 6.

A preferred method for constructing the mirror is as follows. Referring to FIG. 7, honeycomb substrate 30 is coated on both sides by an epoxy film adhesive layer 38, 40. Glass skins 32, 34 are placed in contact with the adhesive coatings. The entire unit is placed in a heated chamber (oven) 40 connected by valve 42 and hose 44 to a source of vacuum 45 capable of applying a vacuum approaching zero. At this relatively low pressure, the glass skins are gently bonded to the adhesive layer reducing the chance of the glass skins breaking during the bonding process.

The advantages of the present mirror construction are more readily discernible by comparison with standard homogeneous glass structures conventional in the art. The following table compares characteristics of both types of construction.

TABLE

COMPARISON OF SOLID GLASS MIRROR SUBSTRATE VS. COMPOSITE CONSTRUCTION

| SAMPLES TESTED | MEASURED TOTAL THICKNESS, $t_1$ | MEASURED TOTAL WEIGHT, w | CALCULATED EFFECTIVE WT DENSITY, $\gamma_{eff}$ | MEASURED CANTILEVER STIFFNESS, k | MEASURED FUNDAMENTAL FREQUENCY, $f_m$ | CALCULATED FUNDAMENTAL FREQUENCY, $F_c$ |
|---|---|---|---|---|---|---|
| (1) HOMOGENEOUS GLASS 17.0 in × 2.0 in | 0.229" | 0.709 lbs (0.693)* | 0.091 lbs.in$^3$ (0.89)* | 55.0 lbs/in (60.0)* | 80.0 hz | 70.9 hz |
| (2) COMPOSITE #1 17.0 in × 2.0 in 3/16" HEXCEL | 0.272" | 0.293 lbs | 0.032 lbs/in$^3$ | 50.0 lbs/in (65.2)** | 130.0 hz | 104.5 hz |
| (3) COMPOSITE #2 17.0 in × 2.0 in ⅜ 6" HEXCEL | 0.458" | 0.315 lbs | 0.020 lbs/in$^3$ | 143 lbs/in (210.3)** | Not tested | 172.3 hz |
| (4) COMPOSITE #3 17.0 in × 2.0 in | 0.585" | 0.335 lbs | 0.017 lbs/in$^3$ | 250 lbs/in (357.1)** | Not tested | 218.7 hz |

TABLE-continued
COMPARISON OF SOLID GLASS MIRROR SUBSTRATE VS. COMPOSITE CONSTRUCTION

| SAMPLES TESTED | MEASURED TOTAL THICKNESS, $t_1$ | MEASURED TOTAL WEIGHT, w | CALCULATED EFFECTIVE WT DENSITY, $\gamma_{eff}$ | MEASURED CANTILEVER STIFFNESS, k | MEASURED FUNDAMENTAL FREQUENCY, $f_m$ | CALCULATED FUNDAMENTAL FREQUENCY, $F_c$ |
|---|---|---|---|---|---|---|
| ½" HEXCEL | | | | | | |

*THEORETICAL VALUES FOR HOMOGENEOUS GLASS
**THEORETICAL VALUES OF COMPOSITE GEOMETRY

The Table lists mechanical performance data for a homogeneous glass sample and 3 composite substrate samples using 3 different thicknesses of honeycomb sandwiched between two pieces of 0.040" sheet glass. The overall thickness, $t_1$, was measured using dial calipers and the total weight, w, was measured using a laboratory scale. The effective weight density, eff, was calculated by dividing the measured weight, w, by the total measured volume (17.0 inch $\times$ 2.0 inch $\times$ "$t_1$"). The cantilever stiffness, k, was measured by rigidly mounting one end of the substrate and applying incremental force values between 0.0 and 5.0 lbs perpendicular to the substrate surface at a distance of 10.0 inches from the fixed end. Corresponding deflections perpendicular to the substrate surface at 10.0 inches were recorded using a dial indicator. Stiffness was observed to be constant over the specified load range.

The measured fundamental frequency, $f_m$, was obtained by applying a transverse random noise source to a mirror base excitation fixture which mounts the mirrors at 4 corner points. The transfer function, which is the accelerometer output of the mirror surface divided by the random noise load input at the base, was evaluated between 0.0 and 200.0 Hz using the HP 5423A Modal Analyzer. The calculated fundamental frequency, $f_c$, was predicted by solving equation (4) for $EI_{net}$ using an $I_c$ value of 10.0 inches and the values in the table for measured cantilever stiffness, k. The value obtained for $EI_{net}$ was then inserted into equation (6) which represents the fundamental frequency of a simply supported beam.

$$f_c = \frac{\pi}{2l^2} \sqrt{\frac{EI_{net}g}{A\gamma_{eff}}} \tag{6}$$

where
l = 17.0 inches
g = 386.4 inches/sec$_2$
A = 2.0 t, in$^2$ and where $t_1$ and $\gamma_{eff}$ are in the table.

Figure 8:
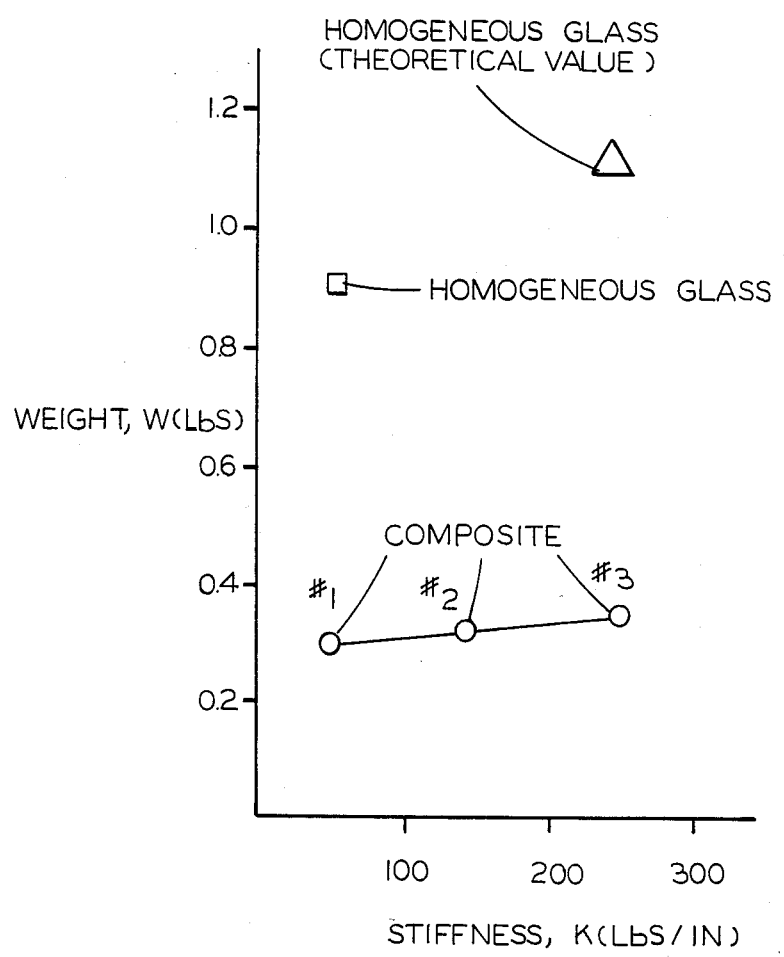
FIG. 8 is a comparative plot of mirror stiffness vs. weight for homogeneous glass and for the composite mirror of the present invention.

Some interesting observations can be made by crossplotting the variables in the table. For instance, FIG. 8 is a comparison of stiffness vs weight for the four samples tested. While maintaining approximately the same stiffness as the homogeneous glass sample, composite substrate #1 is 2.4 times lighter. To increase stiffness by 5.0 times (composite #3) all that is required is to increase the honeycomb thickness to 0.5 inches. This only increases the total weight of the composite substrate by 14%. To accomplish this five-fold increase in the homogeneous glass sample, the thickness would increase to 0.368-inch (assuming a theoretical E = 10.0 $\times$ 10$^6$ psi and applying equations (3) and (4)). This thickness increase would result in a linearly proportional increase in the weight of 61% as indicated in FIG. 4. This is extremely important during a polishing process when the substrate stiffness is not high enough to produce acceptable mirror figure, and weight constraints on carriages restrict increasing mirror thickness (which increases mass) to increase stiffness. And, of course, the dramatic weight reduction of the honeycomb sample is of considerable importance in reducing the cost of a scanning system and improving its performance. Since less mass must be accelerated to scan and return speeds, the drive requirements of the associated scan components (drive motor, clutches, cables, pulleys, bearings, carriage support structure) can all correspondingly be reduced. Less powerful motors, clutches, etc. results in an additional savings.

The final observations to be made on the table are with respect to weight, w, effective weight density, $\gamma_{eff}$, cantilever stiffness, k, and fundamental natural frequency, $f_m$ and $f_c$. For a homogeneous glass sample, stiffness increases, the overall weight increases and the effective weight density remains constant due to the fact that it is a homogeneous material. However, for composite geometries as you increase the stiffness you must also increase the thickness but, the overall weight is increased so little that the effective weight density, $\gamma_{eff}$, decreases. This becomes very important considering mirrors acting under their own weight. In the static case, the concern would be for gravity loading. In the case of static deflection, a mirror with too low of a stiffness-to-mass ratio will sag beyond a tolerable limit and distort the image. In the case of dynamic deflection, a low stiffness-to-mass ratio will produce a lower fundamental frequency. A lower natural frequency mirror will respond (dynamically deflect) greater than a higher natural frequency mirror for the same input level of random noise. Thus, the lower frequency homogeneous glass mirror would be subjected to greater deflection and greater image distortion than the higher frequency composite samples.

Although two moving mirrors have been shown in the FIG. 1 embodiment, it is understood that the advantages of the present mirror construction are even greater when multiple scan rate systems are used, such as those disclosed in U.S. Pat. No. 4,407,581, previously referenced.

In conclusion, it may be seen that there has been disclosed an improved optical imaging system where honeycomb composite mirrors provide significant improvements in both natural frequency (50–300%) and stiffness (upwards to 500%) while simultaneously decreasing total weight. These improvements result in improved overall image quality when embodied in mirrors moved in an optical scanning system. The exemplary embodiment described herein is presently preferred, however, it is contemplated that further variations and modifications within the purview of those skilled in the art can be made herein. The following claims are intended to cover all such variations and modifications as fall within the spirit and scope of the invention.

What is claimed is:

1. An improved scanning system for scanning a document lying in an object plane and for projecting an image along an optical path onto a photoconductive surface, said system including:

an illumination assembly for incrementally illuminating said document;

at least one mirror operatively associated with said illumination assembly; and a lens adapted to project an image of said document onto said photoreceptor plane, the improvement wherein said mirror is a composite structure comprising glass skins bonded to the surface of a lightweight substrate having a honeycomb configuration.

2. Apparatus for optically scanning a stationary original document to create a flowing light image of the original including:

a stationary viewing platen for supporting an original document in a horizontal plane;

movable illumination means for incrementally illuminating portions of the document during a scan cycle, and at least one reflecting element arranged to move along a path of travel parallel to said platen so as to reflect said scanned incremental image along an optical path, said reflecting element comprising a honeycomb metal substrate sandwiched between polished glass surfaces, the composite providing a relatively low mass element.

* * * * *